United States Patent [19]
Constant

[11] Patent Number: 5,007,083
[45] Date of Patent: Apr. 9, 1991

[54] SECURE COMPUTER

[76] Inventor: James N. Constant, 1603 Danbury Dr., Claremont, Calif. 91711

[21] Appl. No.: 692,321

[22] Filed: Jan. 16, 1985

Related U.S. Application Data

[63] Continuation of Ser. No. 244,661, Mar. 17, 1981, abandoned.

[51] Int. Cl.$^5$ .......................... H04L 9/06; H04L 9/10
[52] U.S. Cl. ..................................... 380/9; 380/23; 380/25; 380/49; 380/50; 380/52
[58] Field of Search ............... 178/22.08, 22.09, 22.01, 178/22.18; 346/22; 364/900, 200; 357/72, 84; 380/23-25, 9, 49, 50, 52; 235/379, 380, 420

[56] References Cited

U.S. PATENT DOCUMENTS

| | | | |
|---|---|---|---|
| 3,614,546 | 10/1971 | Avins | 357/84 |
| 3,617,817 | 11/1971 | Kawakatsu et al. | 357/84 |
| 3,754,170 | 8/1973 | Tsuda et al. | 357/84 |
| 3,761,682 | 9/1973 | Barnes et al. | 235/379 |
| 3,897,901 | 8/1976 | Grosswiller, Jr. et al. | 346/22 |
| 3,937,925 | 2/1976 | Boothroyd | 364/900 |
| 3,941,977 | 3/1976 | Voss et al. | 235/379 |
| 3,943,335 | 3/1976 | Kinker et al. | 235/379 |
| 3,956,615 | 5/1976 | Anderson et al. | 235/379 |
| 3,984,739 | 10/1976 | Mochizuki et al. | 357/72 |
| 4,074,066 | 2/1978 | Ehrsam et al. | 178/22.06 |
| 4,075,460 | 2/1978 | Gorgens | 235/420 |
| 4,107,458 | 8/1978 | Constant | 178/22.1 |
| 4,211,919 | 7/1980 | Ugon | 380/25 |
| 4,215,421 | 7/1980 | Giraud | 364/900 |
| 4,259,720 | 3/1981 | Campbell | 375/211 |
| 4,264,782 | 4/1981 | Konheim | 178/22.08 |
| 4,306,111 | 12/1981 | Lu et al. | 178/22.1 |
| 4,326,098 | 4/1982 | Bourcicius et al. | 178/22.19 |
| 4,368,357 | 11/1983 | Gurak | 455/26 |
| 4,369,332 | 11/1983 | Campbell, Jr. | 178/22.18 |
| 4,386,233 | 5/1983 | Smid et al. | 178/22.08 |

OTHER PUBLICATIONS

Key Notarization System for Computer Networks, NBS (10/79) Smid pp. 4–9.
IEEE Spectrum (1/72) pp. 67–78, "Is your computer secure?" Beardsley.
Communications of ACM, (8/79) vol. 22, No. 8, pp. 477–482 Denning "Secure Personal Computing in a Insecure Network".
Electronics (6/21/79) Hinolin, No. 13, vol. 52, pp. 107–120 178/22.01.

*Primary Examiner*—Thomas H. Tarcza
*Assistant Examiner*—Bernarr Earl Gregory

[57] ABSTRACT

A computer or communication system having physically secure vault means which include data source, receiver and decoder-encoder (cryptosystem). Data outside the vault means is coded and thereby protecting its loss from electronic tapping. Clear data inside the vault means is protected by the vault.

61 Claims, 1 Drawing Sheet

SECURE COMPUTER

BACKGROUND OF THE DISCLOSURE

The present invention relates to the security of data in computers and communications systems and more particularly to the protection of data using vaults to enclose message sources/receivers and encoders/decoders. This disclosure is based on my disclosure document 079595 filed Mar. 26, 1979 and on my application No. 244,661 filed Mar. 17, 1981 now abandoned of which this application is a continuation.

The program and data of a conventional computer or communications system are vulnerable to theft or electronic tapping. In the past, this problem has been reduced by employing decoder-encoders as peripheral devices in connection with data sources and receivers. In this arrangement, the decoder-encoders are connected to the data sources and receivers so that the program and/or data can be coded and decoded, and thereby for preventing the loss of data against electronic tapping. However, while this arrangement goes a long way to secure the program and data in the communication channel it still leaves the program and data vulnerable to theft and electronic tapping in the area of the source or receiver. For example, in many applications, a computer user does not control the computer area in which cases the necessity to operate the central processing unit CPU in the clear exposes the program and data to theft and electronic tapping by others having access to the computer room. It is the purpose and object of this invention to provide apparatus and method which secures the program and data prior/after it has been coded/decoded. Moreover, the security of most conventional cryptosystems depends entirely on the secrecy of the key. As result, keys needed by users of such systems must be distributed by means of a secure channel such as a trusted courier. It is another purpose of the invention to provide apparatus and method which allows the distribution of its keys by insecure channels. The current state of the art of computer security is discussed in the article by R. Sugarman "On foiling computer crime" appearing in the July 1979 issue of IEEE Spectrum.

SUMMARY OF THE INVENTION

This invention provides apparatus and method for securing programs and data before/after they have been encoded/decoded. The general purpose of the invention is to provide new and improved secure computers and communications systems. While the prior cryptographic art of computers and communications systems requires operating these systems in combination with decoders-encoders, as separate units, the invention system requires the physical securing of the data source, receiver and decoder-encoder inside a vault means which is mechanically or electronically inaccessible to others. By coding its keys, the invention keys may be distributed over insecure channels. Utilizing the system of the invention, the security of programs and data used by computers and communication systems is enhanced in areas not covered by the prior art and thereby for providing new and improved secure systems.

Briefly, the present invention encloses the transmit-receive areas of a computer or communications system and the decoder-encoder inside vault means with provision that the vault means is mechanically and electrically inaccessible to others. In operation, the system user provides his program and data, for example payroll, medical data, special algorithms, etc., to the computer or communication system in code. The code is selected to obtain the level of security warranted by the data being protected. The system user, owner or manufacturer may provide the vault means including data source, receiver and decoder-encoder for operating the system. However, the system user controls the key for operating the decoder-encoder so that the coded program and data flowing to and from the data source and receiver are always under positive control by the user; the coded data external to the vault means is secured by the code while the clear data prior to or after coding-decoding is secured by the vault means. The system user may encode the key so that the coded key flowing to and from the data source and receiver is always under positive control of the user; the coded key external to the vault means is secured by the code while the clear key is secured by the vault means.

In view of the foregoing description, the simplicity of construction of a secure computer and communication system will become apparent. As result, new and improved secure computers and communications systems, in accordance with the present invention, may be produced which are efficient for use and mass consumption in a variety of applications used for computing, sending and receiving proprietary data, payrolls, bank transfers of funds, medical and personnel records, credit data, etc. Accordingly, the present invention may result in the significant prevention of computer and communications related thefts and electronic tapping.

These and other objects and advantages, the nature of the present invention and its various features, will appear more fully upon consideration of the various illustrations of embodiments now to be described in detail in connection with the accompanying drawings.

DESCRIPTION OF THE PREFERRED EMBODIMENTS

Figure 1:
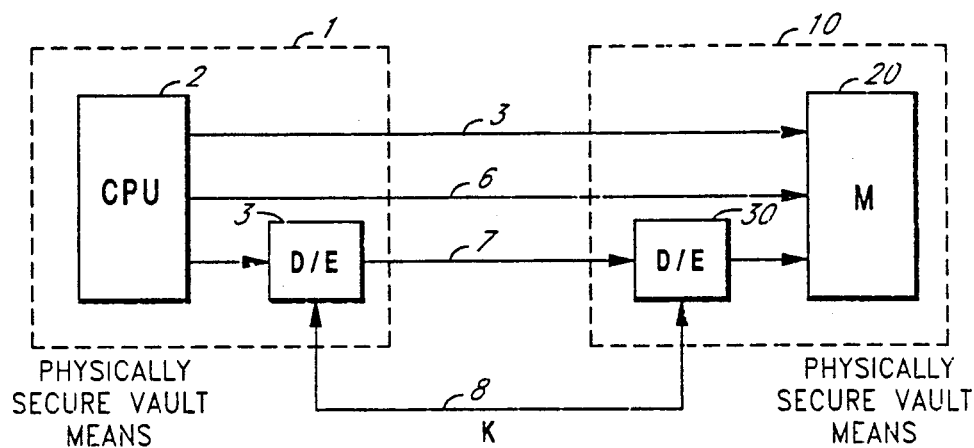
FIG. 1 is a block diagram of a computer which uses the secure vault means of the invention.

FIG. 1 is a block diagram of a computer which uses the secure vault means of the invention. Included in vault means 1 is, as a minimum, the central processing unit CPU 2 of a conventional computer and a conventional decoder-encoder (crypto-system) 3. Vault means 1 might be included in a secure computer which might be included in a secure room which might be included in a secure building, and so forth. Similarly, included in vault means 10 is, as a minimum, the memory M 20 of the conventional computer and a conventional decoder-encoder (cryptosystem) 30. Other computer circuits may also be included in vault means 1 and 10, if desired.

The CPU 2 may be any one of a number of types, for example including CPUs listed in the "1979 Microcomputer Data Manual" appearing in the Mar. 1, 1979 issue of Electronic Design. The decoder-encoder D/E 3 may be any one of a number of types, for example D/Es shown in the articles "Handheld Cryptographic Device Enabled by Custom LSI Chip" appearing in the September 1978 issue of Computer Design, "Hand-held Crypto Graphic Unit" appearing in the December 1978 issue of Digital Design, the ED-15 Programmable Encoder-Decoder described in the November 1978 sales brochure of Supertex Corp., the 8294 Data Encryption unit described in the May 1978 sales brochure of Intel Corp., and the "Cipher Computer and Cryptographic System" appearing in my U.S. Pat. No. 4,107,458.

Typically, in a conventional computer, CPU 2 is connected to a memory M 20 through control 5, address 6 and data 7 buses, for example as shown in the cited Microcomputer Data Manual. Memory M 20, as example, may be a program, data or coefficient memory. The invention requires first inserting D/Es 3 and 30 in the data bus between CPU 2 and M 20 and second enclosing CPU 2 with D/E 3 and M 20 with D/E 30 in physically secure vault means 1 and 10. Means (not shown) may be used in D/E 3 or D/E 30, for example switching means, to enable the use of bus 7 with or without coding, i.e., for operating CPU 2 and M 20 as either a coded or uncoded computer. Finally a mechanical or electronic key 8 may be used to control the coding and decoding of D/Es 3 and 30, i.e., key 8 is selected to obtain the coding security desired and is always in possession and control of the computer user. While this is not shown in the figure, decoder-encoders may be used in lines 5–8.

Vault means 1 and 10 may be any one of a number of types of secure physical means having provisions of being inaccessible mechanically or electrically. Preferably, vault means 1 and 10 may be single monolithic chips, for example monolithic chips which include the combination of a CPU, as shown in the cited Microcomputer Data Manual, and the ED-15 or 8294 decoder-encoder chips. The making of monolithic chips is a standard task. Since key 8 is resident in vault means 1 and 10, it may be desired to provide self-destruct means (not shown) if vault means 1 and 10 are accessed or removed. For example, the loss of power may result in erasing the contents of elements 2, 3, 20 and 30, a standard task. Or, the mechanical or electromagnetic probing of vault means 1 and 10 may result in similar erasures, again a standard task. It will be obvious therefore to provide the desired physically and electrically secure vault means 1 and 10.

In operation, data flows between CPU 2 and M 20 in the manner of a conventional computer. If D/Es 3 and 30 are used, data outside vault means 1 and 10 is coded and thereby preventing its loss through electronic tapping. While data between CPU 2 and D/E 3 or between M 20 and D/E 30 is uncoded (clear) vault means 1 and 10 prevents its loss through theft or electronic tapping. Alarm means (not shown) may be included internal and external to vault means 1 and 10 to indicate the mechanical or electrical tampering, compromise, failure or removal of vault means 1 and 10 and thereby to alert the user for possible theft or tapping attempt. If the vault means 1 and 10 have been compromized or stolen, they can be replaced by similar means 1 and 10 but with a different key K 8. And, different keys K 8 may be employed by different users of the computer.

From the foregoing, it will be appreciated that CPU 2, M 20 and D/Es 3 and 30 may be any one of a number of types on condition that these elements be enclosed in physically and electrically secure vault means 1 and 10, preferably as monolithic chips.

Figure 2:
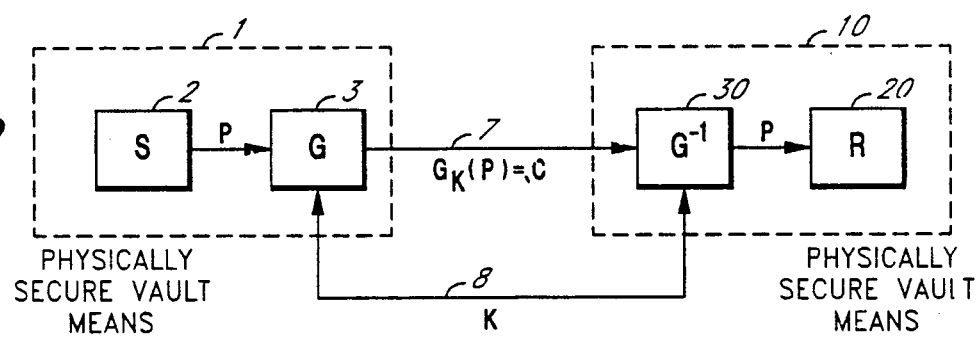
FIG. 2 is a block diagram of a communication system which uses the secure vault means of the invention.

FIG. 2 is a block diagram of a communication system which uses the secure vault means of the invention. Included in vault means 1 is a message source 2 and a conventional decoder-encoder 3. Included in vault means 10 is a receiver 20 and a conventional decoder-encoder 30.

Message source 2 provides clear plaintext P to decoder-encoder 3 which operates on the plaintext with an algorithm G and key K to generate a ciphertext $G_K(P)=C$. The ciphertext C can be transmitted over an insecure communications channel such as a telephone line or radio channel 7. Another algorithm $G^{-1}$ effects the inverse operation in decoder-encoder 30. Knowing $G^{-1}$ and K, the decoder-encoder 30 operates on the ciphertext C with $G_K^{-1}$ to recover the plaintext $P=G_K^{-1}(C)$. An external monitor who knows G and $G^{-1}$ and intercepts C but does not know K will not be able to decipher the message. Hence, the security of the FIG. 2 system lies entirely in the secrecy of key K. As result, keys K needed by users of the FIG. 2 system must be sent by means of a secure channel 8 such as a trusted courier. At both ends of the communications channel 7, the clear plaintext P is protected by vault means 1 and 10. A secure channel access may be provided for accessing message source S 2 and receiver R 20.

Figure 3:
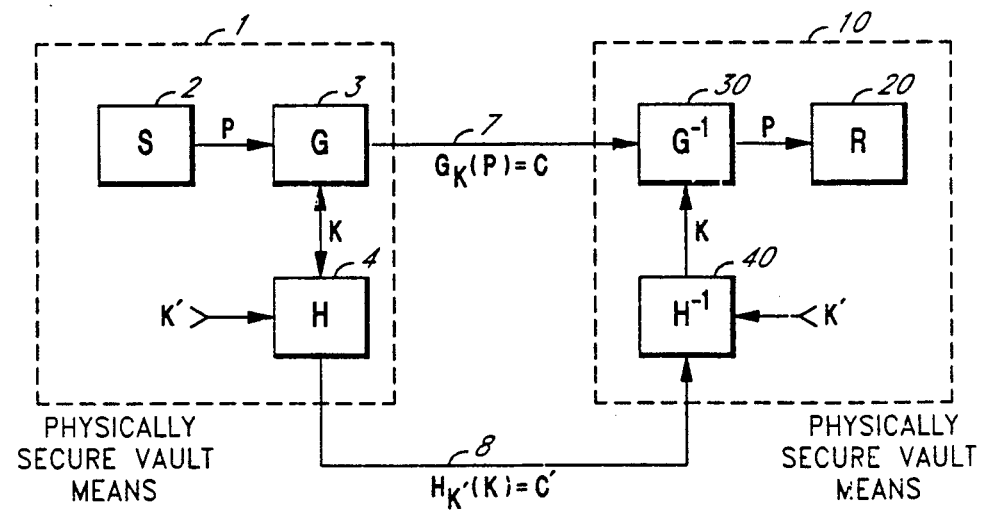
FIG. 3 is a block diagram of another communication system which uses the secure vault means of the invention.

FIG. 3 is a block diagram of another communication system which uses the secure vault means of the invention. Included in vault means 1 is a message source 2, data decoder-encoder 3 and key decoder-encoder 4. Included in vault means 10 is a receiver 20, data decoder-encoder 30 and key decoder-encoder 40.

Message source 2 provides plaintext P to data decoder-encoder 3 which operates on the plaintext P with an algorithm G and key K to generate a ciphertext $G_K(P)=C$. The ciphertext C can be transmitted over an insecure communications channel such as a telephone line or radio channel 7. Another algorithm $G^{-1}$ effects the inverse operation in data decoder-encoder 30. Knowing $G^{-1}$ and K, the decoder-encoder 30 operates on the ciphertext C with $G_K^{-1}$ to recover the plaintext $P=G_K^{-1}(C)$. Similarly, key decoder-encoder 4 operates on key K with an algorithm H and key K' to generate a ciphertext $H_{K'}(K)=C'$. The ciphertext C' can be transmitted over an insecure communications channel such as a telephone line or radio channel 8. Another algorithm $H^{-1}$ effects the inverse operation in key decoder-encoder 40. Knowing $H^{-1}$ and K', the decoder-encoder 40 operates on the ciphertext C' with $H_{K'}^{-1}$ to recover the key $K=H_{K'}^{-1}(C')$. An external monitor who knows G, $G^{-1}$, H, $H^{-1}$ and intercepts C and C' but does not know K or K' will not be able to decipher the message. Hence, the security of the FIG. 3 system does not depend on a secure channel 8 for the distribution of keys. As long as the keys K and K' are kept secret, there is no way for an external monitor to decipher ciphertexts C and C'. At both ends of communications channels 7 and 8, the clear plaintext P and keys K and K' are protected by vault means 1 and 10.

In FIG. 3, it will be appreciated, plaintext P and key K can be multiplexed into a single decoder-encoder 3 to obtain ciphertexts C and C' in a single communications channel 7, the use of dual units 3 and 4 in FIG. 3 being by way of example. And, it is possible to have $G=H$. Also, it is possible to provide the case in which different keys are used to compute G and $G^{-1}$, for example the public key system discussed in the article by M. Hellman "The Mathematics of Public Key Cryptography" appearing in the August 1979 issue of Scientific American. In this case, keys $G^{-1}$, $H^{-1}$ would not be the inverses of keys G, H with result it would be possible to reveal all keys except one. Clearly, this case would obviate the use of decoder-encoders 4 and 40 since there is no longer need to use channel 8. However, since the known public key systems are slow speed compared to the more conventional systems, the use of vault means 1 and 10 of the invention permits, for the first time, the use of insecure communications channels 8 for distributing coded keys. Finally, it will be further appreciated, the invention can also improve authentication. Because conventional systems share a common key for sending and receiving messages, they cannot protect against disputes between the transmitter and receiver as to what message, if any, was sent. In contrast, the invention key need not be known to both the sender and receiver and therefore there can be no disclaimer between the sender or receiver of the message. This useful feature of the invention is similar to the public key systems where one key is made public but the other key is kept secret. Thus, the invention combines the high speed feature of conventional systems and authenticating feature of public key systems.

From the foregoing, it will be appreciated that message source 2, decoder-encoders 3, 4 and receiver 20, decoder-encoders 30, 40 may be any ones of a number of types on condition that these elements be enclosed in physically and electrically secure vault means, preferably as monolithic chips.

In many computer and communications applications it is desired to prevent the theft or tapping of program, data and algorithms. Such applications may require logical operations which include general purpose software computers or special purpose hardware computers, or may require the general communication of information. These activities might include computations of proprietory algorithms, the transfer of bank funds, payrolls, medical and personnel records, credit data and so forth. The system of the invention performs these tasks in a secure manner compared to the prior art lacking vault means.

Although a secure computer and communications systems have been described, it should be understood that the scope of the invention should not be considered to be limited by the particular embodiments of the invention shown by way of illustration but rather by the appendant claims.

I claim:

1. A means for protecting information containing at least one of a central processing unit (CPU) and memory and at least one of an encrypter and decrypter,
   said means being temporarily inserted in a computer or information transfer device.

2. A method for protecting information including the steps of:
   containing at least one of an information source or sink and at least one of an encrypter and decrypter in a protecting means; and
   temporarily inserting said protecting means in one of a transmitter or receiver.

3. A means for protecting information containing a central processing unit (CPU) and at least one of an encrypter and decrypter,
   said means being temporarily inserted in a computer or information transfer device.

4. The system of claim 3 wherein said means contains a memory.

5. A method for protecting information including the steps of:
   containing a central processing unit (CPU) and at least one of an encrypter and decrypter in a protecting means; and
   temporarily inserting said protecting means in a computer or information transfer device.

6. The method of claim 5 including the step of containing a memory in said protecting means.

7. A means for protecting information containing at least one of a central processing unit (CPU) and memory and containing an encrypter,
   said means being temporarily inserted in a computer or information transfer device.

8. The system of claim 7 wherein said means contains a decrypter.

9. A method for protecting information including the steps of:
   containing at least one of a central processing unit (CPU) and memory and containing an encrypter in a protecting means; and
   temporarily inserting said protecting means in a computer or information transfer device.

10. The method of claim 9 including the step of containing a decrypter in said protecting means.

11. A means for protecting information containing a central processing unit (CPU) and encrypter,
    said means being temporarily inserted in a computer or information transfer device.

12. The system of claim 11 wherein said means contains at least one of a memory and decrypter.

13. The system of one of claims 1, 3, 8, 12 including switching means for operating said computer or information transfer device with and without said encrypter and decrypter.

14. The system of one of claims 1, 3, 8, 12 wherein said protecting means includes means for at least one of encrypting and decrypting the key used by said encrypter and decrypter.

15. The system of claim 14 wherein said means for encrypting and decrypting the key used by said encrypter and decrypter uses a key which is inaccessible from outside said protecting means.

16. The system of claim 14 wherein said means for encrypting and decrypting the key used by said encrypter and decrypter has as input said key used by said encrypter and decrypter and provides output which is inaccessible from outside said protecting means.

17. The system of claim 14 wherein said means for encrypting and decrypting the key used by said encrypter and decrypter has an input a key which is inaccessible from outside said protecting means and provides output said key used by said encrypter and decrypter.

18. The system of one of claims 1, 3, 8, 12 wherein said protecting means provides at least one of the physical, mechanical and electromagnetic access to said encrypter and decrypter.

19. The system of one of claims 1, 3, 8, 12 wherein said encrypter and decrypter uses a key which is inaccessible from outside said protecting means.

20. The system of one of claims 1, 3, 7, 11 wherein said protecting means is at least one of a physically, mechanically and electromagnetically secure means.

21. The system of one of claims 1, 3, 7, 11 wherein elements in said protecting means erase their mechanical and electrical contents when mechanically or electrically disconnected.

22. The system of one of claims 1, 3, 7, 11 wherein said protecting means is a monolithic semiconductor chip.

23. The system of one of claims 1, 3, 7, 11 wherein said protecting means includes one of a data, program and coefficient memories.

24. The system of one of claims 1, 3, 7, 11 wherein said protecting means includes at least one of a tamperproof and alarm means.

25. The system of one of claims 1, 3, 7, 11 wherein said protecting means is a vault means.

26. The system of one of claims 1, 3, 7, 11 wherein said computer is a general purpose computer.

27. The system of one of claims 1, 3, 7, 11 wherein said computer is a special purpose computer.

28. The system of one of claims 1, 3, 7, 11 wherein said CPU is an arithmetic logic unit (ALU).

29. The system of one of claims 1, 3, 7, 11 wherein said computer is one of a host computer, a computer-based terminal or peripheral.

30. The system of one of claims 1, 3, 7, 11 wherein said computer is one of a minicomputer, microcomputer, or microprocessor.

31. The system of one of claims 1, 3, 7, 11 wherein said protecting means is a tamperproof means.

32. The system of one of claims 1, 3, 7, 11 wherein said protecting means is permanently embedded in said computer or information transfer device.

33. The system of one of claims 1, 3, 7, 11 wherein said protecting means is a portable means.

34. The system of one of claims 1, 3, 7, 11 wherein said protecting means is one of a credit, identification or information card.

35. The system of one of claims 1, 3, 7, 11 wherein said protecting means is accessible from outside said computer or information transfer device.

36. The system of one of claims 1, 3, 7, 11 wherein said computer or information transfer device is at least one of a transmitter or receiver.

37. The method of one of claims 2, 5, 8, 12 including the step of at least one of enciphering and deciphering the key used by said encrypter and decrypter.

38. The method of claim 37 including the step of using a key for enciphering and deciphering the key used by said encrypter and decrypter, said key for enciphering and deciphering being inaccessible from outside said protecting means.

39. The method of claim 37 including the step of using said key by said encrypter and decrypter to provide another key which is inaccessible from outside said protecting means.

40. The method of claim 37 including the step of using a key which is inaccessible from outside said protecting means to provide said key used by said encrypter and decrypter.

41. The system of one of claims 1, 4, 7, 12 wherein said memory contains information protected by a cipher.

42. The system of one of claims 1, 4, 7, 12 wherein said memory contains a computer program protected by a cipher.

43. A method for protecting information including the steps of:

containing a central processing unit (CPU) and encrypter in a protecting means; and temporarily inserting said protecting means in a computer or information transfer device.

44. The method of claim 43 including the step of containing at least one of a memory and decrypter in said protecting means.

45. The method of one of claims 2, 5, 9, 43 including the step of providing one of a physically, electrically and electromagnetically secure protecting means.

46. The method of one of claims 2, 5, 9, 43 including the step of providing elements in said protecting means which erase their mechanical and electrical contents when mechanically or electrically disconnected.

47. The method of one of claims 2, 5, 9, 43 including the step of providing said protecting means as a monolithic semiconductor chip.

48. The method of one of claims 2, 5, 9, 43 including the step of providing at least one of a data, program and coefficient memories in said protecting means.

49. The method of one of claims 2, 5, 9, 43 including the step of providing said protecting means with at least one of a tamperproof and alarm means.

50. The method of one of claims 2, 5, 9, 43 including the step of providing said protecting means as a vault means.

51. The method of one of claims 2, 5, 9, 43 including the step of providing said computer or information transfer device as a general purpose computer.

52. The method of one of claims 2, 5, 9, 43 including the step of providing said computer or information transfer device as a special purpose computer.

53. The method of one of claims 2, 5, 9, 43 including the step of providing said computer or information transfer device as at least one of a transmitter or receiver.

54. The method of one of claims 2, 5, 9, 43 including the step of providing said protecting means as a tamperproof means.

55. The method of one of claims 2, 5, 9, 43 including the step of permanently embedding said protecting means in said computer or information transfer device.

56. The method of one of claims 2, 5, 9, 43 including the step of providing said protecting means as a portable means.

57. The method of one of claims 2, 5, 9, 43 including the step of providing said protecting means as one of a credit, identification or information card.

58. The method of one of claims 2, 5, 9, 43 including the step of providing said protecting means accessible from outside said computer or information transfer device.

59. The method of one of claims 2, 5, 10, 44 including the step of providing switching means for operating said computer or information transfer device with and without said encrypter and decrypter.

60. The method of one of claims 2, 5, 10, 44 including the step of using said protecting means to protect at least one of the physical, mechanical and electromagnetic access to said encrypter and decrypter.

61. The method of one of claims 2, 5, 10, 44 including the step of using a key for said encrypter and decrypter, said key being inaccessible from outside said protecting means.

* * * * *